US009638382B2

(12) United States Patent
Pawliczek et al.

(10) Patent No.: US 9,638,382 B2
(45) Date of Patent: May 2, 2017

(54) LED MODULES WITH BALL JOINT ADJUSTABLE SUPPORT

(71) Applicant: Hella KGaA Hueck & Co., Lippstadt (DE)

(72) Inventors: Gerhard Pawliczek, Erwitte (DE); Thomas Richesh Thanapaul, Maharashtra (IN)

(73) Assignee: Hella KGaA Hueck & Co., Lippstadt (DE)

( * ) Notice: Subject to any disclaimer, the term of this patent is extended or adjusted under 35 U.S.C. 154(b) by 141 days.

(21) Appl. No.: 14/413,673

(22) PCT Filed: Jun. 29, 2013

(86) PCT No.: PCT/EP2013/063757
§ 371 (c)(1),
(2) Date: Jan. 8, 2015

(87) PCT Pub. No.: WO2014/009185
PCT Pub. Date: Jan. 16, 2014

(65) Prior Publication Data

US 2015/0204499 A1 Jul. 23, 2015

(30) Foreign Application Priority Data

Jul. 13, 2012 (DE) ........................ 10 2012 106 314

(51) Int. Cl.

| | |
|---|---|
| ***F21V 21/29*** | (2006.01) |
| ***B60Q 1/06*** | (2006.01) |
| ***F21S 8/10*** | (2006.01) |

(52) U.S. Cl.
CPC ......... *F21S 48/1104* (2013.01); *F21S 48/115* (2013.01); *F21S 48/1109* (2013.01); *F21S 48/321* (2013.01); *Y10T 29/49826* (2015.01)

(58) Field of Classification Search
CPC ............................ F21V 21/29; B60Q 2200/32
See application file for complete search history.

(56) References Cited

U.S. PATENT DOCUMENTS

| | | | | |
|---|---|---|---|---|
| 1,615,067 A * | 1/1927 | Boerman | F21V 21/29 | 174/21 JC |
| 5,722,762 A * | 3/1998 | Soll | F21L 15/14 | 362/105 |
| 7,011,431 B2 * | 3/2006 | Ono | F21S 4/20 | 362/241 |

(Continued)

FOREIGN PATENT DOCUMENTS

| | | |
|---|---|---|
| DE | 202008005814 U1 | 9/2008 |
| DE | 102007029080 A1 | 12/2008 |

(Continued)

*Primary Examiner* — Ismael Negron
(74) *Attorney, Agent, or Firm* — Husch Blackwell LLP

(57) ABSTRACT

A modular assembly for a headlight includes at least one semiconductor light module having at least one semiconductor light source mounted on a cooling element, having at least one ball socket in which the semiconductor light module is mounted and configured to be pivoted about a ball socket center, a curved cup formed in the cooling element and configured to be mounted in the ball socket, and a guide shell arranged between the curved cup and the ball socket. A method for adjusting the semiconductor light module is also disclosed.

8 Claims, 2 Drawing Sheets

(56) References Cited

U.S. PATENT DOCUMENTS

| | | | | |
|---|---|---|---|---|
| 7,661,818 | B2 * | 2/2010 | Waters | F21V 21/084 351/158 |
| 7,744,259 | B2 * | 6/2010 | Walczak | F21V 14/02 362/294 |
| 7,896,520 | B1 * | 3/2011 | Norling | A47J 37/0786 362/191 |
| 8,172,436 | B2 * | 5/2012 | Coleman | F21V 21/096 362/249.02 |
| 8,277,095 | B2 * | 10/2012 | Juang | H01R 35/04 362/371 |
| 8,414,164 | B2 * | 4/2013 | Ogawa | F21S 8/043 362/294 |
| 8,602,612 | B2 * | 12/2013 | Stathis | F21V 21/26 362/413 |
| 8,979,305 | B2 * | 3/2015 | Sachsenweger | F21V 21/096 362/249.01 |
| 2008/0225546 | A1 | 9/2008 | Lin et al. | |
| 2009/0027900 | A1 * | 1/2009 | Janos | F21V 21/0824 362/373 |
| 2009/0251916 | A1 | 10/2009 | Tanaka et al. | |
| 2010/0128483 | A1 * | 5/2010 | Reo | F21S 8/038 362/294 |
| 2012/0049733 | A1 | 3/2012 | Gallai et al. | |

FOREIGN PATENT DOCUMENTS

| | | | |
|---|---|---|---|
| DE | 102008007647 | A1 | 8/2009 |
| DE | 102010040892 | A1 | 3/2012 |
| DE | 202010008779 | U1 | 3/2012 |
| DE | 102010060642 | A1 | 5/2012 |
| JP | 2009021135 | A | 1/2009 |
| JP | 2009259654 | A | 11/2009 |
| WO | 2012011947 | A1 | 1/2012 |
| WO | 2012048351 | A1 | 4/2012 |

* cited by examiner

LED MODULES WITH BALL JOINT ADJUSTABLE SUPPORT

CROSS REFERENCE

This application claims priority to PCT/EP2013/063757, filed Jun. 29, 2013, which itself claims priority to German Application No. 10 2012 106314.1, filed Jul. 13, 2012, which are both hereby incorporated by reference.

FIELD OF TECHNOLOGY

The present invention relates to a modular assembly for a headlight having at least one semiconductor light module and a method for adjusting the semiconductor light module which is mounted on a support frame, wherein the semiconductor light module comprises a cooling element having at least one semiconductor light source mounted on the cooling element.

BACKGROUND

The latest designs of headlights have modular assemblies for emitting light with one or preferably multiple semiconductor light modules, and the modular assemblies have support frames by means of which the one or multiple semiconductor light modules can be mounted in the headlight. At the same time, the support frame is used as an arrangement for retaining the semiconductor light modules in the housing of the headlight. Each particular semi conductor light module forms a portion of a light field, which is generated by the headlight in front of the vehicle. As a result, the individual semiconductor light modules must have a precise adjustment position in the support frame. Manufacturing tolerances which develop when producing the semiconductor light modules with the cooling element and the attachment parts, as well as manufacturing tolerances when producing the support frame, can result in positional errors of the semiconductor light modules which exceed already permissible limits. For example, one or preferably multiple semiconductor light sources are mounted on the cooling element in the form of individual emitters, emitting light to a reflector mounted on the cooling element. Then the light is guided from the reflector through the cover lens of the headlight to the area in front of the vehicle. At the same time, the position of the cooling element in the support frame is decisive for the portion of the light field emitted from the individual semiconductor light module. The semiconductor light source is directly mounted on the cooling element, resulting in the fact that it is cooled by the cooling element, wherein in the case at hand the cooling element basically describes any element used to form the semiconductor light module, and the semiconductor light module can dissipate heat by convection via its surface.

US 2009/0303726 A1 discloses a semiconductor light module which has been mounted in a support frame. The semiconductor light module has a cooling element which has a semiconductor light source mounted on its front surface and on its rear surface the cooling element has multiple cooling ribs for cooling the semiconductor light source. The light emitted by the semiconductor light source is guided through a lens and the cooling element is mounted in the support frame by means of three fixing points. By adjusting the screws in the fixing points, the position of the cooling element can be adjusted in relation to the lens. The screw elements in the fixing points have adjustable axes which extend parallel to one another.

U.S. Pat. No. 7,972,049 B2 shows a semiconductor light module which has a cooling element to which a semiconductor light source has been mounted and a reflector can be mounted via two screw elements to the cooling element. At the same time, the connection points between the reflector and the cooling element have adjustment ramps and, depending on the rotation of the adjustment ramps, the reflector can be rotated about an axis so as to be aligned in relation to the semiconductor light source. However, it is not possible to mount the semiconductor light module in a support frame.

U.S. Pat. No. 7,798,690 B2 discloses a modular assembly in which multiple semiconductor light modules are arranged in a support frame and a respective semiconductor light source is mounted to each semiconductor light module and, via a screw element, it is also possible to mount a reflector. The mount the reflector in the exact position on the cooling element, three definite contact points are determined, allowing for a precise attachment of the reflector on the cooling element. However, no provision has been made for adjusting the reflector on the cooling element.

SUMMARY OF THE INVENTION

Therefore, it is the object of the invention to provide a modular assembly for a headlight having at least one semiconductor light module which makes it possible that the semiconductor light module can be easily adjusted in the support frame of the modular assembly.

The invention includes the technical knowledge that the support frame has at least one ball socket in which the semiconductor light module with the cooling element is inserted and can be pivoted about a ball socket center.

The invention is based on the idea of using a ball socket for mounting the semiconductor light module on the support frame, so that the semiconductor light module with the cooling element can be pivoted in the ball socket in multiple axes about a ball socket center. As a result, the semiconductor light module on the support frame can be easily adjusted about a Y-axis transversely to the direction of light distribution and about a vertical axis Z, which forms the vertical direction Z of the headlight. Therefore, it is no longer required to use separate adjustment means because it is sufficient to adjust the semiconductor light module by pivoting it about the ball socket center. For example, the ball socket is geometrically designed in such a way that the ball socket center is located approximately between the semiconductor light source and a reflector, which is arranged on the cooling element and which is also a component of the semiconductor light module. In addition, the ball socket center can form a type of optical center of the semiconductor light module, which can be available especially when the semiconductor light module consists of at least one semiconductor light source and a lens.

According to an advantageous further development of the invention-based semiconductor light module, the cooling element can have a curved cup which is designed to be inserted in the ball socket in the support frame. At the same time, the curved cup can be in direct physical contact with the ball socket, or a further guide shell is provided which is arranged between the curved cup and the ball socket. On the one hand, the guide shell makes it possible that the semiconductor light module can be pivoted separately about the Y-axis transversely to the direction of light distribution while, on the other hand, the semiconductor light module can be pivoted about the Z-axis, which forms the vertical axis Z of the headlight.

For example, the curved cup can be designed in such a way that it is diverted in the guide shell so that the semiconductor light module is pivoted about the Y-axis transversely to the direction of light distribution X. Furthermore, it can be arranged that the curved cup is provided with a guide rib which is inserted in a guiding groove in the guide shell in order to guide the pivoting movement about the Y-axis. As a result, the semiconductor light module is pivoted about the Y-axis transversely to the direction of light distribution, i.e., for adjusting the height of the emitted light provided by the semiconductor light module in that the curved cup is diverted in the semiconductor light module in relation to the guide shell.

Furthermore, the guide shell can be designed in such a way that it is diverted in the ball socket so that the semiconductor light module is pivoted about the Z-axis, which forms the vertical axis Z of the headlight. For this purpose, a transverse rib can be provided on the guide shell which is inserted in a transverse groove arranged in the ball socket. As a result, the semiconductor light module is pivoted about the vertical axis Z in that the guide shell together with the cooling element of the semiconductor light module is diverted in the ball socket. In order to respectively guide the diverting movements, the guide ribs have been precisely fitted in the guiding groove, and the transverse rib has been precisely fitted in the transverse groove. At the same time, the extension directions of the guiding rib intersect with the guiding groove and the transverse rib with the transverse groove, approximately perpendicular to each other.

According to a further measure, a pin can be arranged on the curved cup, which pin extends through the guiding groove and a through-groove in the ball socket so that the pin extends out of the rear surface of the ball socket of the support frame. For example, the pin can be used to induce an adjustment force in the semiconductor light module, which can take place manually or by means of a technical adjusting device. To ensure that the semiconductor light module is retained in the ball socket of the support frame, it is possible to provide mounting devices by means of which the curved cup can be fixed in the ball socket, in particular with the intermediate guide shell. For example, the mounting devices can involve screw elements and a mounting plate, which is mounted on the rear side of the support frame. At the same time, the pin can extend through the mounting plate, wherein the screw elements can be screwed into the curved cup and particularly into the guiding rib.

Furthermore, the invention relates to a method for adjusting a semiconductor light module in a headlight, wherein the semiconductor light module is mounted on a support frame in the headlight and wherein the semiconductor light module comprises a cooling element and at least one semiconductor light source mounted on the cooling element. To perform the method, provision has been made that the at least one semiconductor light module with the cooling element is pivoted about a ball socket center, wherein the ball socket center is formed by at least one ball socket which is designed in the support frame and in which the semiconductor light module is mounted. In a further procedural step, it can be provided that when the semiconductor light module has been adjusted on the support frame the semiconductor light module is fixed by means of mounting devices in the ball socket. For example, if the mounting devices involve screw elements, these can be slightly tightened in the ball socket of the support frame before the semiconductor light module is pivoted, so that it is still possible to move the semiconductor light module, in particular the cooling element, in the ball socket. When the semiconductor light module has been adjusted on the support frame, the screw elements can be completely tightened to ensure that the position of the semiconductor light module on the support frame can no longer be changed.

BRIEF DESCRIPTION OF THE DRAWINGS

Reference is now made more particularly to the drawings, which illustrate the best presently known mode of carrying out the invention and wherein similar reference charac-ters indicate the same parts throughout the views.

DETAILED DESCRIPTION OF THE DRAWINGS

Figure 1:
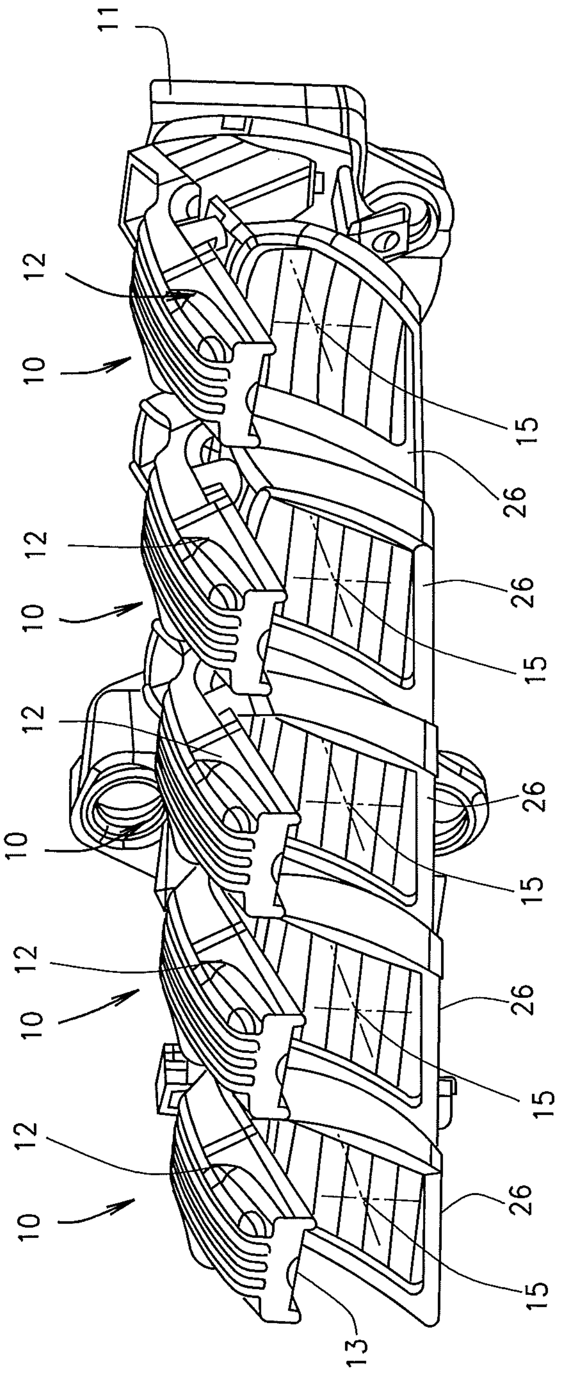
FIG. 1 is a perspective view of a support frame having multiple semiconductor light modules, which are mounted in respective ball sockets on the support frame and which are pivoted about ball socket centers.

FIG. 1 shows a perspective view of a modular assembly 1, which has a support frame 11 to which five semiconductor light modules 10 have been mounted in an exemplary manner. Each of the semiconductor light modules 10 is basically formed by a cooling element 12, and the cooling element forms a base body of the semiconductor light module 10, wherein the base body is shown only in an exemplary manner to have cooling ribs. At the same time, the present term of the cooling element 12 describes basically each body on which the semiconductor light source 13 is mounted.

On the cooling element 12 of each one of the semiconductor light modules 10, a semiconductor light source 13 has been mounted by means of which light can be emitted. When the semiconductor light source 13 is put into operation, light is illuminated to a reflector 26, which is also mounted on the cooling element 12. As a result, a semiconductor light module 10 forms a respective light unit for emitting light having a cooling element 12, a semiconductor light source 13 and a reflector 26.

Figure 2:
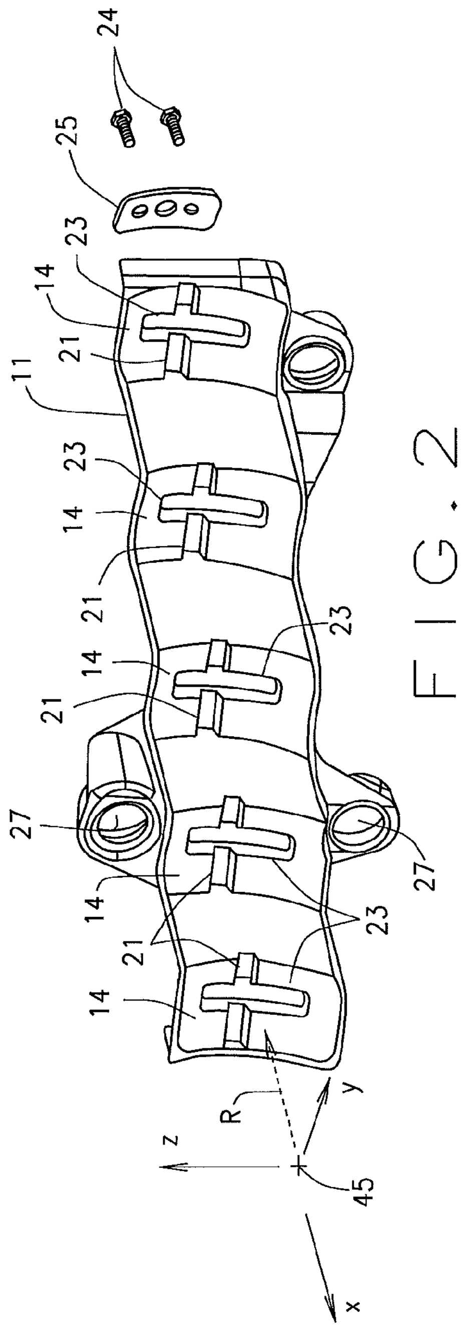
FIG. 2 is a perspective view of the support frame with an allocated number of ball sockets.

FIG. 2 shows a perspective view of the support frame 11 without semiconductor light modules 10. The support frame 11 can be mounted via position points 27 in the headlight. The support frame 11 is designed to receive five semiconductor light modules 10. For this purpose, the support frame 11 has five ball sockets 14 in which the semiconductor light modules 10 with the cooling elements 12 can be mounted to pivot about a ball socket center 15 in order to form the invention-based modular assembly 1. Each of the ball sockets 14 has its own ball socket center 15. At the same time, the ball socket center 15 forms the point about which a radius R can be moved in order to define the concave surface of the ball socket 14. FIG. 1 shows that he ball socket center 15 can be located in a position between the semiconductor light source 13 and the surface of the reflector 26.

Figure 5:
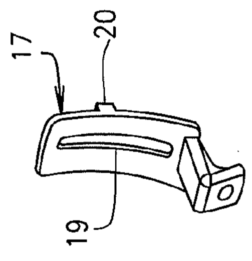
FIG. 5 is a perspective view of the guide shell, which can be arranged between the ball socket and the curved cup.

On the surface of the ball sockets 14, transverse grooves 21 have been inserted which, for example, extend horizontal in relation to the mounting position of the support frame 11. FIG. 5 shows that in the ball sockets 14, guide shells 17 have been inserted which are formed by the same radius of curvature as the ball sockets 14. As a result, the guide shell 17 can be diverted in a surface-fit manner in the ball socket 14. On the contact surface of the guide shell 17, a transverse rib 20 has been arranged which can be inserted in the transverse groove 21 in the ball socket 14.

In each of the ball sockets 14, a particular guide shell 17 can be inserted, each of which can be pivoted axis Z through the guidance of the transverse ribs 20 in the transverse grooves 21 in relation to the ball socket center 15 about the vertical.

Figure 4:
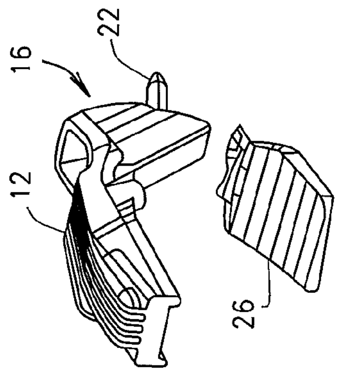
FIG. 4 is a perspective view of the cooling element with an allocated reflector.
Figure 3:
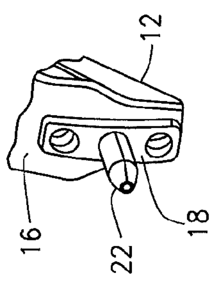
FIG. 3 is a detailed view of the cooling element with the ball socket.

Furthermore, the cooling element 12 according to FIG. 3 and FIG. 4 is provided with a curved cup 16, and the curved cup 16 has a radius of curvature so that the curved cup 16 of the cooling element 12 can be inserted in a surface-fit manner and diverted in the guide shell 17. On the surface of the curved cup 16, a guiding rib 18 has been arranged which can be diverted in a form-fit manner in a guiding groove 19 inserted in the guide shell 17. As a result, the cooling element 12 can be pivoted about an axis Y, which extends in an extension direction transverse to the direction of light distribution X, about the ball socket center 15. FIG. 3 shows how the guiding rib 18 is arranged on the curved cup 16 of the cooling element 12, while FIG. 5 shows a perspective view of the guide shell 17.

FIG. 4 shows a perspective view of the cooling element 12, wherein it also shows a reflector 26, which can be arranged on the cooling element 12. In the curved cup 16 of the cooling element 12, a pin 22 is mounted which is located in an exemplary manner in the center of the guiding rib 18 (see FIG. 3). When the guide shell 17 is arranged in the ball socket 14 and then the cooling element 12 is inserted in the guide shell 17, the pin 22 extends through the guiding groove 19 and a through-groove 23 which has been inserted in the ball socket 14.

Also shown are screw elements 24 and a mounting plate 25, which can be arranged on the rear surface of the support frame 11 in the region of the ball sockets 14. When the cooling element 12 and the guide shells 17 are inserted in the ball sockets 14, the cooling elements 12 can be fastened by means of the screw elements 24 and the mounting plate 25 on the support frame 11. Initially, it is sufficient to slightly tighten the screw elements 24, thus allowing the cooling element 12 to be adjusted in the ball sockets 14. At the same time, the adjustment by the pin 22 can be performed manually or with an alignment device. When the cooling element 12 is correctly positioned on the support frame 11, the screw elements 24 can be completely tightened so as to secure the achieved position of the semiconductor light modules 10 on the support frame 11.

The design of the invention is not restricted to the previously mentioned embodiments. Instead, it is possible to use a plurality of variants which utilize the solution described above even with basically different designs. All features and/or advantages resulting from the claims, the description and the drawings, including structural details, spatial arrangements and procedural steps, can be important aspects of the invention by themselves or in different combinations.

REFERENCE LIST

1 modular assembly
10 semiconductor light module
11 support frame
12 cooling element
13 semiconductor light source
14 ball socket
15 ball socket center
16 curved cup
17 guide shell
18 guiding rib
19 guiding groove
20 transverse rib
21 transverse groove
22 pin
23 through-groove
24 screw element
25 mounting plate
26 reflector
27 position point
R radius
X direction of light distribution
Y axis, extension direction transverse to the direction of light distribution
Z vertical axis, vertical direction

The invention claimed is:

1. A modular assembly for a headlight, the assembly comprising:
- at least one semiconductor light module having a cooling element and at least one semiconductor light source mounted on the cooling element;
- a support frame having at least one ball socket in which the semiconductor light module is mounted and configured to be pivoted about a ball socket center;
- a curved cup formed in the cooling element, and configured to be mounted in the at least one ball socket of the support frame; and
- a guide shell arranged between the curved cup and the at least one ball socket.

2. The modular assembly according to claim 1, further comprising:
- a transverse rib formed on the guide shell; and
- a transverse groove formed in the ball socket, wherein the transverse rib is received in the transverse groove.

3. The modular assembly according to claim 1 wherein further comprising an intermediate guide shell, and at least a screw element and an mounting plate, to fix the curved cup in the ball socket with the intermediate guide shell, wherein the mounting devices comprise at least a screw element and a mounting plate.

4. A vehicle headlight having at least one modular assembly according to claim 1.

5. The modular assembly according to claim 1, wherein the curved cup is configured to slide in the guide shell so as to allow the semiconductor light module to be pivoted about a Y axis located transverse to an X axis defined along the main light emission direction of the at least one semiconductor light source.

6. The modular assembly according to claim 5, wherein the guide shell is configured in the ball socket so as to allow the semiconductor light module to be pivoted about a Z axis orthogonal to both the X and Y axes.

7. The modular assembly according to claim 5, further comprising:
- a guiding rib formed on the curved cup; and
- a guiding groove formed in the guide shell,
- wherein the guiding rib is received in the guiding groove to guide the pivoting movement of the semiconductor light module about the Y axis.

8. The modular assembly according to claim 7, further comprising:

a pin formed on the curved cup, and extending through the guiding groove, the through-groove of the ball socket, and out of the rear surface of the ball socket of the support frame.

* * * * *